US012304019B2

(12) United States Patent
Arimitsu et al.

(10) Patent No.: US 12,304,019 B2
(45) Date of Patent: May 20, 2025

(54) FASTENING APPARATUS AND FASTENING METHOD

(71) Applicant: HONDA MOTOR CO., LTD., Tokyo (JP)

(72) Inventors: Takeshi Arimitsu, Tokyo (JP); Yasutaka Ishizuka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/588,057

(22) Filed: Feb. 27, 2024

(65) Prior Publication Data

US 2024/0326184 A1    Oct. 3, 2024

(30) Foreign Application Priority Data

Mar. 31, 2023   (JP) ................. 2023-057155

(51) Int. Cl.
*B23P 19/10* (2006.01)
*B23P 19/06* (2006.01)
(Continued)

(52) U.S. Cl.
CPC ............ *B23P 19/10* (2013.01); *B23P 19/06* (2013.01); *B25J 9/1687* (2013.01); *B25J 13/085* (2013.01)

(58) Field of Classification Search
CPC .......... B25J 9/1697; B25J 13/08; B23P 19/06; B23P 19/065; B23P 19/066; B23P 19/10; B23P 19/102; B23P 19/105; B25B 23/04
See application file for complete search history.

(56) References Cited

U.S. PATENT DOCUMENTS 10,657,419 B2 *  5/2020  Kurtz ................. G06V 10/462
11,383,334 B2 *  7/2022  Arimitsu .............. B25B 13/28
(Continued)

FOREIGN PATENT DOCUMENTS

CN    110836637    2/2020
JP    05-008614    2/1993
(Continued)

OTHER PUBLICATIONS

Japanese Notice of Allowance for Japanese Patent Application No. 2023-057155 mailed Oct. 15, 2024.

*Primary Examiner* — Jason L Vaughan
(74) *Attorney, Agent, or Firm* — Amin, Turocy & Watson, LLP

(57) ABSTRACT

A fastening apparatus assembles an assembly component to an assembled component by fastening a fastening member. The fastening apparatus includes: an imaging device that captures, in a state where the assembly component having a first fastening hole is mounted on an upper portion of the assembled component having a second fastening hole, an image of a region including at least the first fastening hole; and a control device that calculates a first position of the first fastening hole and a second position of the second fastening hole based on the captured image. The control device controls a robot to cause the fastening member to be moved to and inserted into the first fastening hole based on the first position and to move the assembly component in a state where the fastening member is inserted in the first fastening hole in a direction of the second position, and controls the robot to fasten the fastening member in response to detection of the fastening member being inserted into the second fastening hole.

14 Claims, 8 Drawing Sheets

(51) Int. Cl.
*B25J 9/16* (2006.01)
*B25J 13/08* (2006.01)

(56) References Cited

U.S. PATENT DOCUMENTS

| | | | |
|---|---|---|---|
| 11,731,275 B2* | 8/2023 | Ohno | B25J 13/08 |
| | | | 700/259 |
| 11,999,024 B2* | 6/2024 | Sugioka | B25J 9/1679 |
| 2015/0119214 A1* | 4/2015 | Sasaki | B25J 15/0052 |
| | | | 483/1 |
| 2017/0205798 A1* | 7/2017 | Ishii | B25J 11/005 |
| 2018/0215038 A1* | 8/2018 | Ueda | B25J 9/1633 |

FOREIGN PATENT DOCUMENTS

| | | |
|---|---|---|
| JP | 05-237729 | 9/1993 |
| JP | 05-346099 | 12/1993 |
| JP | 2005-022006 | 1/2005 |
| JP | 2012-020345 | 2/2012 |
| JP | 2012-143842 | 8/2012 |

* cited by examiner

FASTENING APPARATUS AND FASTENING METHOD

CROSS-REFERENCE TO RELATED APPLICATION

Priority is claimed on Japanese Patent Application No. 2023-057155, filed on Mar. 31, 2023, the contents of which are incorporated herein by reference.

BACKGROUND

Field of the Invention

The present invention relates to a fastening apparatus and a fastening method.

Background

In the manufacture of products such as a battery pack of electric automobiles, automation of processes is required. One of the processes that require automation is a fastening process of a bolt in which a fastening means such as a bolt or a screw is inserted into a fastening hole on a work piece and is fastened.

An example of automation of the fastening process is described in, for example, Japanese Unexamined Patent Application, First Publication No. 2012-20345. Japanese Unexamined Patent Application, First Publication No. 2012-20345 discloses a process of searching a position of a fastening hole in a wide range by calculating a coordinate such that a movement trajectory of a fastening component becomes a spiral trajectory.

SUMMARY

Japanese Unexamined Patent Application, First Publication No. 2012-20345 discloses a fastening apparatus of searching a fastening hole in a spiral form extending outward having a center at a point when a screw is not in a fastening hole. In this way, by searching in a spiral form, there is a problem that it takes a long time to search a fastening hole.

An object of an aspect of the present invention is to provide a fastening apparatus and a fastening method that shorten the time required for a fastening process of a bolt.

A fastening apparatus according to a first aspect of the present invention is a fastening apparatus that assembles an assembly component to an assembled component by fastening a fastening member. The fastening apparatus includes an imaging device and a control device. The imaging device captures, in a state where the assembly component having a first fastening hole is mounted on an upper portion of the assembled component having a second fastening hole, an image of a region including at least the first fastening hole. The control device calculates a first position of the first fastening hole and a second position of the second fastening hole based on the captured image. The control device controls a robot to cause the fastening member to be moved to and inserted into the first fastening hole based on the first position and to move the assembly component in a state where the fastening member is inserted in the first fastening hole in a direction of the second position, and controls the robot to fasten the fastening member in response to detection of the fastening member being inserted into the second fastening hole.

A second aspect is the fastening apparatus according to the first aspect described above, wherein when the captured image includes an image of at least part of the second fastening hole, the control device may calculate the second position of the second fastening hole based on the image of the second fastening hole of the captured image.

A third aspect is the fastening apparatus according to the first or second aspect described above, wherein the fastening apparatus may include: a storage device that stores distance information indicating a distance from an outline of the assembled component to the second fastening hole, and the control device may calculate the second position based on a position of the outline of the assembled component in the captured image and the distance information when the captured image does not include an image of at least part of the second fastening hole.

A fourth aspect is the fastening apparatus according to any one of the first to third aspects described above, wherein the fastening apparatus may further include: a haptic sensor that measures a force applied on the fastening member, and when the assembly component in a state where the fastening member is inserted in the first fastening hole is moved in the direction of the second position, the control device may stop the movement when a sensor value obtained by the haptic sensor exceeds a first threshold value.

A fifth aspect is the fastening apparatus according to any one of the first to fourth aspects described above, wherein the fastening apparatus may include: at least a sensor which is any one of a haptic sensor that measures a force applied on the fastening member and a displacement sensor that measures a movement amount of the fastening member, and the control device may detect that the fastening member is inserted into the second fastening hole when a sensor value obtained by the sensor or a change amount of the sensor value exceeds a second threshold value.

A sixth aspect is the fastening apparatus according to any one of the first to fifth aspects described above, wherein the control device may control the robot to reciprocate the assembly component in a state where the fastening member is inserted in the first fastening hole while changing a movement direction when it is not detected that the fastening member is inserted into the second fastening hole after the assembly component in the state where the fastening member is inserted in the first fastening hole is moved in the direction of the second position.

A seventh aspect is the fastening apparatus according to any one of the first to sixth aspects described above, wherein when a distance between the calculated first position and the calculated second position is less than a predetermined value, the control device may cause the fastening member to be moved to and inserted into the first fastening hole based on the first position and may fasten the fastening member without moving the assembly component in a state where the fastening member is inserted in the first fastening hole in the direction of the second position.

An eighth aspect is the fastening apparatus according to any one of the first to seventh aspects described above, wherein the assembly component may include a plurality of first fastening holes each being the first fastening hole, a fastening process may be performed on one first fastening hole among the plurality of first fastening holes later than another first fastening hole among the plurality of first fastening holes, and the control device may move the assembly component in a state where the fastening member is inserted in the one first fastening hole in the direction of the second position in a state where a fastening state of the fastening member of the other first fastening hole is loosened.

A fastening method according to a ninth aspect of the present invention includes: capturing, in a state where an assembly component having a first fastening hole is mounted on an upper portion of an assembled component having a second fastening hole, an image of a region including at least the first fastening hole; calculating a first position of the first fastening hole and a second position of the second fastening hole based on the captured image; controlling a robot to cause a fastening member to be moved to and inserted into the first fastening hole based on the first position and to move the assembly component in a state where the fastening member is inserted in the first fastening hole in a direction of the second position; and controlling the robot to fasten the fastening member in response to detection of the fastening member being inserted into the second fastening hole.

According to the first to ninth aspects, it is possible to shorten the time required for a fastening process of a bolt.

DESCRIPTION OF EMBODIMENTS

An embodiment of the present invention will be described below with reference to FIG. 1 to FIG. 8D.
(Configuration of Fastening Apparatus)

Figure 1:
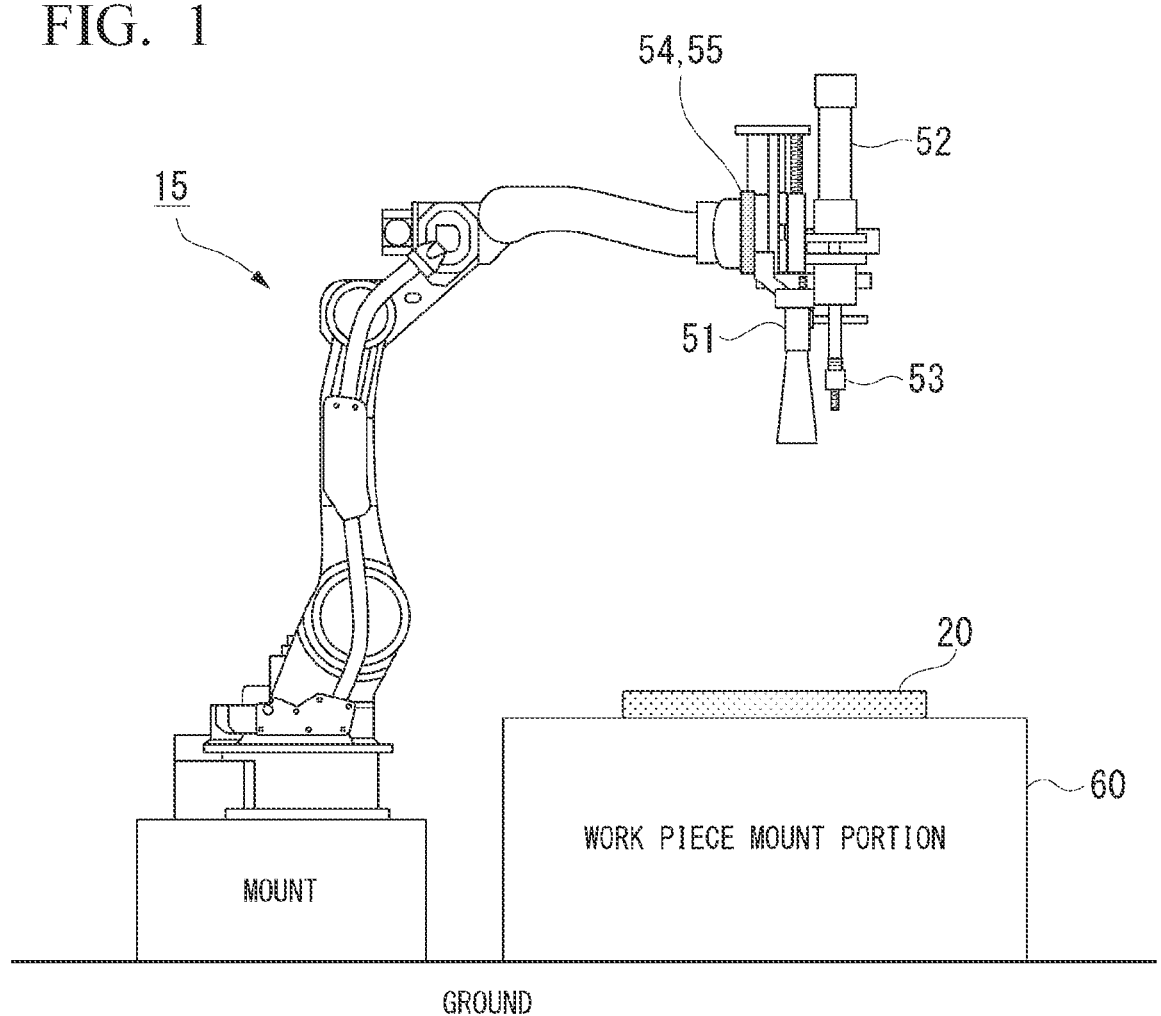
FIG. 1 is an overall view of a fastening apparatus in the present embodiment.
Figure 2:
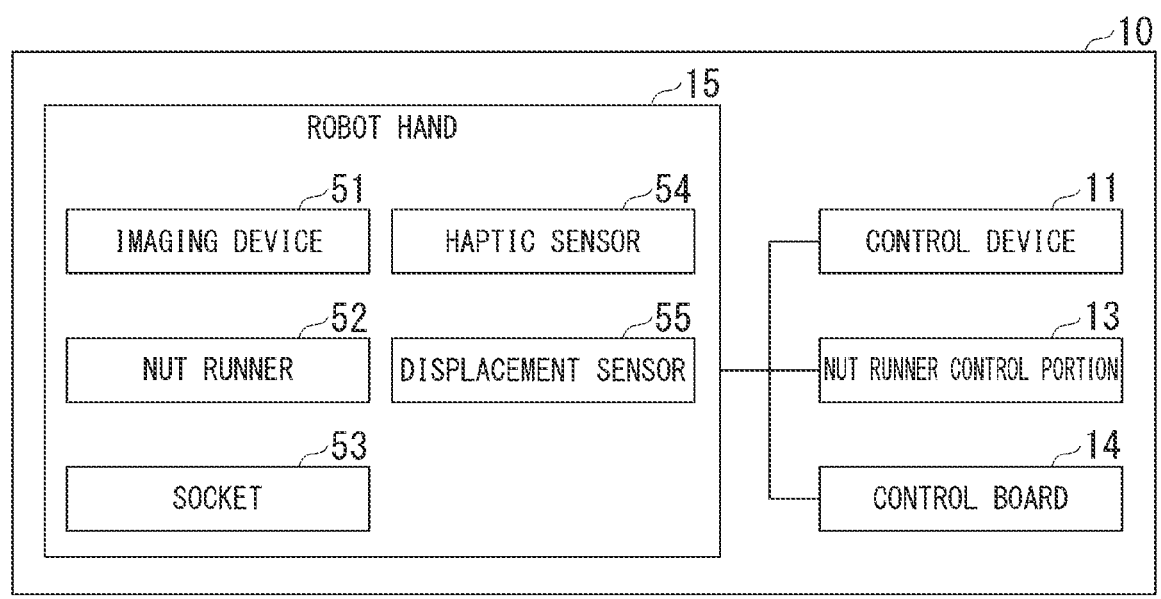
FIG. 2 represents a hardware configuration diagram of the fastening apparatus in the present embodiment.

A configuration of a fastening apparatus according to an embodiment is described with reference to FIG. 1 and FIG. 2. FIG. 1 is an overall view of a fastening apparatus 10 in the present embodiment. FIG. 2 represents a hardware configuration diagram of the fastening apparatus in the present embodiment. The fastening apparatus 10 in the present embodiment includes, for example, a robot hand 15, a control device 11, a nut runner control portion 13, and a control board 14. The robot hand 15 includes, for example, an imaging device 51, a nut runner 52, a socket 53, a haptic sensor 54, and a displacement sensor 55.

A base member 20 (assembled component) is mounted on a work piece mount portion 60 shown in FIG. 1. The robot hand 15 is provided on a mount. The fastening apparatus 10 in the present embodiment assembles, as an example, a bus bar 30 (an assembly component, not shown in FIG. 1 and FIG. 2) to the base member 20.

In the present embodiment, an X-axis direction and a Y-axis direction are directions each being parallel to each of two straight lines that are orthogonal to each other on a plane perpendicular to an insertion direction of a fastening means. A Z-axis direction is a direction parallel to the insertion direction of a screw (fastening means).

The robot hand 15 is, for example, a six-axis multijoint robot hand. The robot hand 15 is constituted as a multijoint arm having a plurality of links and a joint portion that rotatably connects the links. An actuator (not shown) that drives each joint portion is provided on each joint portion. The actuator is, for example, a motor, a hydraulic or pneumatic drive portion, or the like.

The imaging device 51 includes, for example, an imaging element such as a CCD (Charge-Coupled Device) and a lens portion as an optical system. The imaging device 51 captures an image of a member mounted on the work piece mount portion 60 and generates capture image data.

The nut runner 52 is a hand tool or the like attached to a front end of the robot hand 15. The nut runner 52 includes the socket 53 that is rotatable around a shaft by the drive of the drive portion. The socket 53 is attached to a front end of the nut runner 52. The socket 53 has, for example, a magnetic adsorption function (or a vacuum adsorption function) by a magnet and holds a bolt 40 by using the function.

The nut runner 52 rotates the socket 53 around a shaft in response to a control signal from the control device 11. Further, the nut runner 52 stops the rotation of the socket 53 in response to a control signal from the nut runner control portion 13. Thereby, a recess portion of the socket 53 fits to a head portion of the bolt 40.

The haptic sensor 54 and the displacement sensor 55 are attached to a front end of the robot hand 15. The haptic sensor 54 is, for example, a contact touch sensor capable of detecting six-axis components (force components in three-axis directions of X, Y, and Z axes, and moment components in three-axis directions of the X, Y, and Z axes).

The haptic sensor 54 detects a change of a contact state of the socket 53 with the bolt 40 when the socket 53 of the nut runner 52 comes into contact with the bolt 40. That is, the haptic sensor 54 sequentially detects three-axis components of a contact force (reaction force) that the socket 53 receives from the bolt 40, and three-axis components of a moment of the contact force. The haptic sensor 54 sequentially outputs a detection result of the six-axis components to the control device 11.

The haptic sensor 54 may be a torque sensor that detects a torque of a motor. In this case, a plurality of torque sensors detect the torque of the motor and output a detection result to the control device 11.

A detection portion of the control device 11 estimates a change of the contact force of the socket 53 with the bolt 40 on the basis of a detection result of the plurality of torque sensors.

The displacement sensor 55 measures a distance from the sensor to an object. The displacement sensor 55 measures a movement amount (displacement) when the object moves from one position to another position on the basis of measured positional information. The displacement sensor 55 in the present embodiment measures, for example, the movement amount in the Z-axis direction of the bolt 40.

The control device 11 is constituted using a processor such as an IPU (Intelligence-Processing Unit) and a memory. The memory is, for example, a semiconductor memory and has a ROM (Read-Only Memory) that stores various control programs and a RAM (Random-Access Memory) that provides a temporary work area. The control device 11 reads out a program stored in the memory and controls an operation of each device.

The control device 11 operates the robot hand 15 by supplying a control signal to the robot hand 15. Specifically, the control device 11 drives the actuator of the robot hand 15 and rotates a shaft of the actuator. The control device 11 detects, as waveform data, a time change of the contact state or the displacement of the socket 53 and the bolt 40 from the detection result of the sensor. The control device 11 performs a process on the basis of the capture image data generated by the imaging device 51.

The nut runner control portion 13 controls the rotation of the nut runner 52. For example, when a torque increase is detected in accordance with the rotation of the socket 53, the nut runner control portion 13 transmits a fastening completion signal to the control device 11. The control board 14 includes, for example, an amplifier, an electric power source, and a PLC (Programmable Logic Controller).

Figure 3:
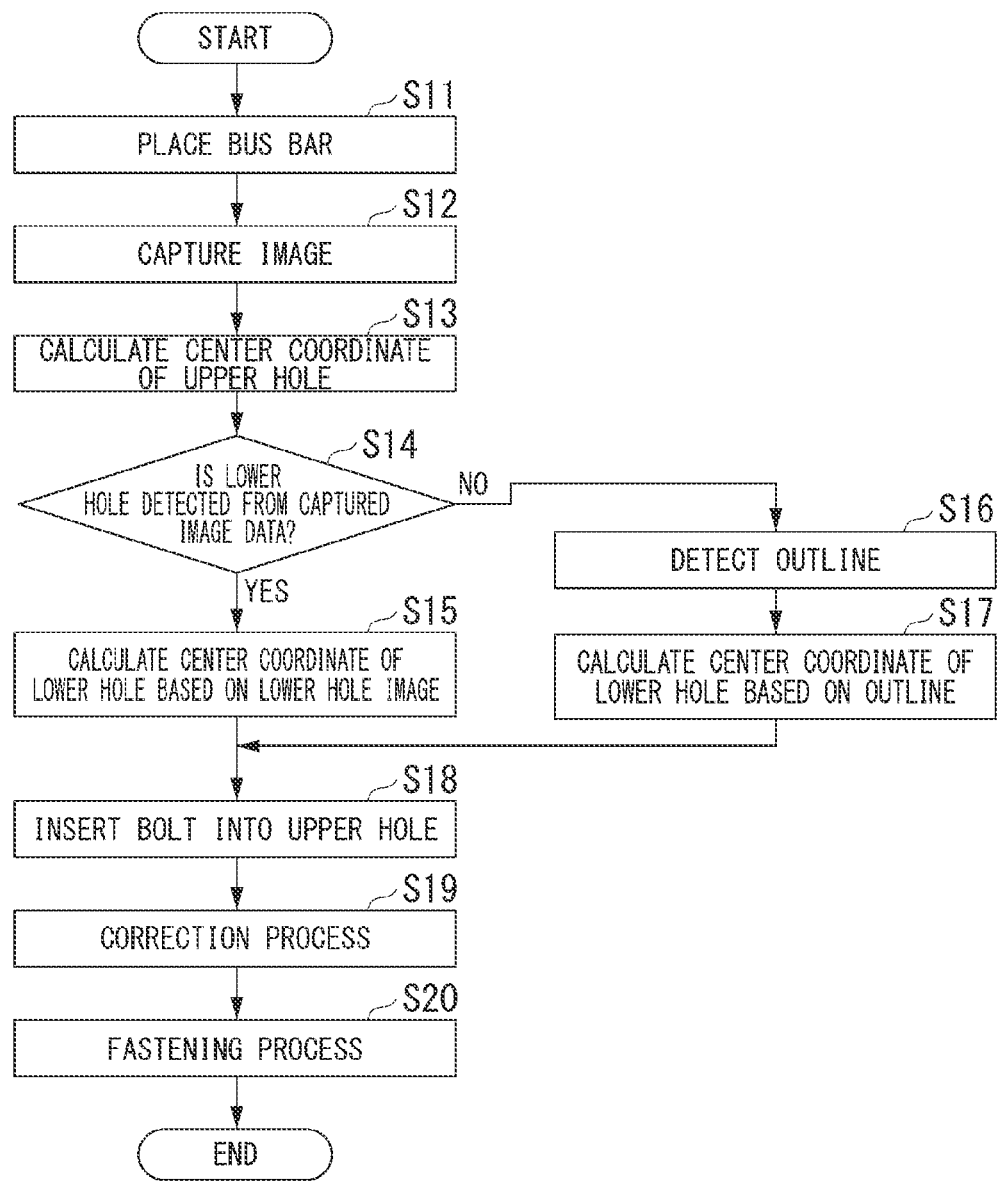
FIG. 3 is a flowchart showing a process flow of the fastening apparatus in the present embodiment.

FIG. 3 is a flowchart showing a process flow of the fastening apparatus 10 in the present embodiment. FIG. 3 shows an example of a process of assembling the bus bar 30 to the base member 20 by fastening the bolt 40. Each of the base member 20 and the bus bar 30 has a fastening hole. The fastening apparatus 10 inserts the bolt 40 into a fastening hole of the base member 20 and a fastening hole of the bus bar 30 and fastens the bolt 40.

Hereinafter, a fastening hole 21 (second fastening hole) of the base member 20 is also referred to as a lower hole, and a fastening hole 31 (first fastening hole) of the bus bar 30 is also referred to as an upper hole. In the present embodiment, the bus bar 30 is described as an example of an assembly component, and the base member 20 is described as an example of an assembled component; however, the embodiment is not limited to the example. The embodiment is also applicable to the case where other members are assembled to each other. The bus bar 30 is an example of an assembly component in the present embodiment. The assembly component in the present embodiment may be a bracket, other co-fastening components, or the like. The bracket is a support tool used for joining members together or an attachment clasp. Further, in the present embodiment, the bolt 40 is described as an example of a fastening member (fastening means); however, the embodiment is not limited to the example. The fastening member may be a screw or another member.

The base member 20 is transported and arranged on the work piece mount portion 60. The robot hand 15 places the bus bar 30, which is a component to be assembled, on the base member 20 arranged on the work piece mount portion 60 (Step S11). The control device 11 controls the robot hand 15 to hold the bus bar 30 and place the bus bar 30 at a target coordinate commanded in advance.

The imaging device 51 captures an image of a region including at least the upper hole 31 of the bus bar 30 from above in a state where the bus bar 30 is placed on the base member 20 (Step S12). Thereby, the imaging device 51 generates capture image data of the region including at least the upper hole 31.

The control device 11 detects an image of the upper hole 31 from the generated capture image data and calculates a center position of the upper hole 31 in the capture image data (Step S13). The control device 11 detects an outline of the upper hole 31 from the capture image data. The memory stores, for example, information of a distance (an X-axis distance, a Y-axis distance) to the center coordinate from the outline of the upper hole 31 in the bus bar 30.

The control device 11 calculates a center position of the upper hole 31 in the capture image data on the basis of positional information of the detected outline of the upper hole 31 and the distance information read from the memory. The control device 11 converts the calculated center position of the upper hole 31 into a spatial coordinate and calculates the center coordinate of the upper hole 31.

The control device 11 determines whether or not an image of at least part of the lower hole 21 of the base member is included in the capture image data (Step S14). When the position displacement between the bus bar 30 and the base member 20 is small, and the distance between the upper hole 31 and the lower hole 21 is small, for example, part or all of the lower hole 21 is seen from the inside of the upper hole 31. In this case, the capture image data includes an image of at least part of the lower hole 21.

In the transport process of the base member 20, the position of the arranged base member 20 may be displaced due to various influences. Alternatively, in the process of placing the bus bar 30, the position of the base member 20 or the bus bar 30 may be displaced. In such cases, the distance between the upper hole 31 and the lower hole 21 may be large. When the position displacement between the bus bar 30 and the base member 20 is large, and the distance between the upper hole 31 and the lower hole 21 is large, for example, the lower hole 21 is hidden by the bus bar 30 or is located around (outside) the bus bar 30.

When the lower hole 21 is covered by the bus bar 30, the image of the lower hole 21 is not detected from the capture image data. On the other hand, when the lower hole 21 is located around the bus bar 30, an image of at least part of the lower hole 21 is detected at the outside of the bus bar 30 from the capture image data.

Figure 4A:
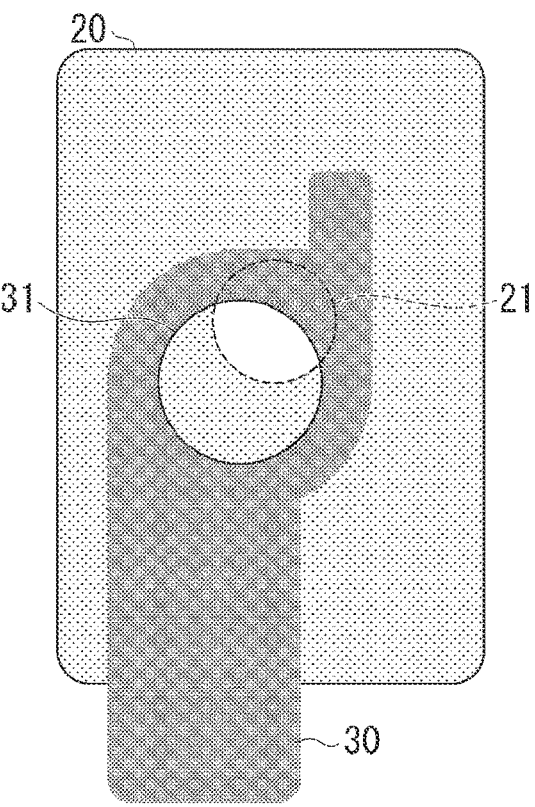
FIG. 4A is a view schematically representing a positional relationship between an upper hole and a lower hole.
Figure 4B:
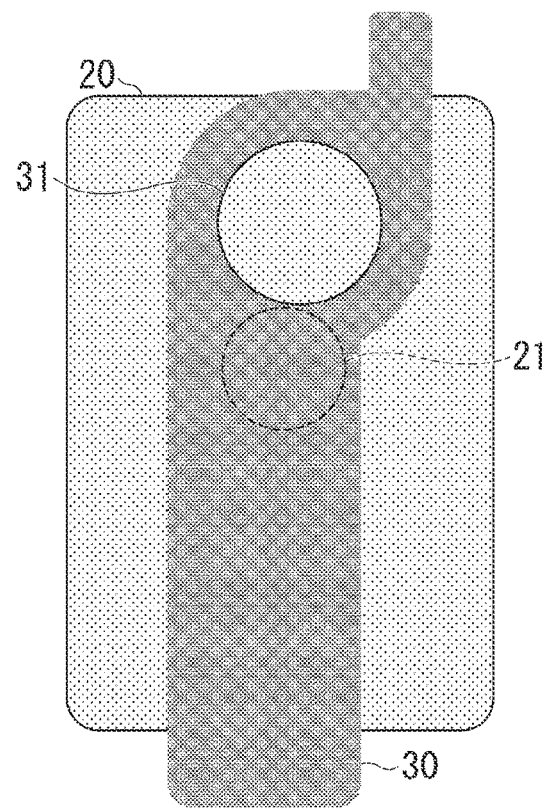
FIG. 4B is a view schematically representing a positional relationship between the upper hole and the lower hole.

FIGS. 4A and 4B are views schematically representing a positional relationship between the upper hole 31 and the lower hole 21. FIG. 4A represents a state in which part of the lower hole 21 is seen from the inside of the upper hole 31. When the upper hole 31 is imaged from above in such a state, an image of at least part of the lower hole 21 is included in the capture image data.

On the other hand, FIG. 4B represents a state in which the placement position of the bus bar 30 is displaced, and thereby, the lower hole 21 is covered by the bus bar 30. When the upper hole 31 is imaged from above in such a state, the image of the lower hole 21 is not included in the capture image data.

In this way, depending on the positional relationship between the upper hole 31 and the lower hole 21, whether or not the image of the lower hole 21 is included in the capture image data differs. With reference back to the flowchart of FIG. 3, the control device 11 calculates the center coordinate of the lower hole 21 on the basis of the generated capture image data.

When the image of the lower hole is detected from the capture image data (Yes in Step S14), the control device 11 calculates the center coordinate of the lower hole 21 on the basis of the image of the lower hole 21 of the capture image data (Step S15). For example, the control device 11 detects part or all of the outline of the lower hole 21 from the capture image data. The control device 11 calculates the center position of the lower hole 21 on the basis of the positional relationship between an outline of the upper hole 31 and an outline of the lower hole 21 in the capture image data. For example, the control device 11 acquires a distance between the upper hole 31 and the lower hole 21 and calculates the center position of the lower hole 21 on the basis of the center position of the upper hole 31 and the acquired distance. The control device 11 converts the calculated center position of the lower hole 21 into a spatial coordinate and calculates the center coordinate of the lower hole 21.

On the other hand, when the image of the lower hole is not detected from the capture image data (No in Step S14), the control device 11 calculates the center coordinate of the lower hole 21, for example, on the basis of an outline of the base member 20 detected from the capture image data. The outline in the present embodiment indicates, for example, an outer shape or form of the base member 20. The outer outline is also referred to as a character line.

The control device 11 detects the outline of the base member 20 from the capture image data (Step S16). The control device 11 detects the outline, for example, by using a technique such as pattern matching. The control device 11 may detect the outline on the basis of another analysis process of the capture image data.

For example, the memory stores information of a distance (an X-axis distance, a Y-axis distance) to the center coordinate of the lower hole 21 from the outline of the base member 20. The control device 11 calculates the center position of the lower hole 21 in the capture image data on the basis of the positional information of the detected outline and the distance information read from the memory. The control device 11 converts the calculated center position of the lower hole 21 into a spatial coordinate and calculates the center coordinate of the lower hole 21 (Step S17).

The control device 11 may calculate the center coordinate of the lower hole 21 on the basis of a position displacement amount of the base member 20. In this case, the memory stores, for example, information of a position of the outline and a position of the lower hole 21 when the base member 20 is appropriately arranged. The control device 11 acquires the position displacement amount of the base member 20 by comparing the stored position with the position of the outline detected on the basis of the capture image data. The control device 11 calculates the center position of the lower hole 21 in the capture image data on the basis of the acquired position displacement amount and the positional information of the lower hole 21 when the lower hole 21 is appropriately arranged. Thereby, the control device 11 can calculate the center coordinate of the lower hole 21 in a space.

When the lower hole 21 is located around the bus bar 30, an example is described in which the image of the lower hole is detected from the capture image data, and the center coordinate of the lower hole 21 is calculated in accordance with Step S15. However, when the lower hole 21 is located around the bus bar 30, the control device 11 may calculate the center coordinate of the lower hole 21 in accordance with Steps S16 and S17. That is, the control device 11 may acquire the center coordinate of the lower hole 21 by detecting the outline of the base member 20 similarly to the case where the lower hole 21 is hidden by the bus bar 30.

The control device 11 controls the robot hand 15 to hold the bolt 40 and move to the center coordinate of the upper hole 31 calculated in Step S13 (Step S18). The control device 11 controls the robot hand 15 to insert the held bolt 40 into the upper hole 31 by moving the held bolt 40 to the calculated center coordinate of the upper hole 31. In this way, by detecting the position of the upper hole 31 on the basis of the capture image data, the bolt 40 can be inserted into the upper hole 31 with high accuracy and at a high speed.

The control device 11 performs a correction process (Step S19). The control device 11 controls the robot hand 15 to move the bus bar 30 in a state where the bolt 40 is inserted in the upper hole 31 of the bus bar 30. When the positions of the upper hole 31 and the lower hole 21 coincide with each other by the movement, the bolt 40 falls into the lower hole 21 of the base member 20, and the bolt 40 is inserted into the upper hole 31 and the lower hole 21. Details of the correction process will be described in the flowchart of FIG. 6.

When detecting that the bolt 40 is inserted in the lower hole 21 as a result of the correction process, the control device 11 controls the robot hand 15 to fasten the bolt 40 (Step S20). The control device 11 commands the nut runner control portion 13 to rotate the socket 53 and thereby fasten the bolt 40.

Figure 5:
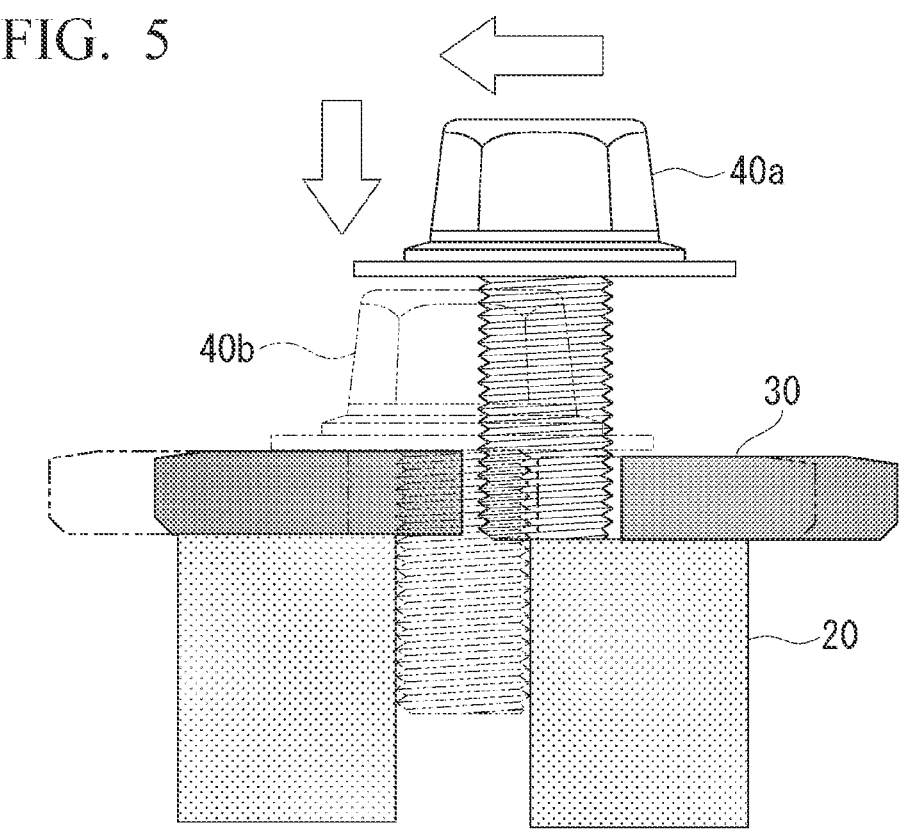
FIG. 5 is a view schematically representing an example of a correction process.

FIG. 5 is a view schematically representing an example of the correction process. A state is shown in which a bolt 40a is inserted in the upper hole 31 of the bus bar 30, and the upper hole 31 and the lower hole 21 do not coincide with each other.

By the correction process, the bus bar 30 together with the bolt 40a is moved such that the upper hole 31 and the lower hole 21 coincide with each other. As a result of the movement, a bolt 40b falls into the lower hole 21 of the base member 20 while being inserted in the upper hole 31 of the bus bar 30. By the bolt 40b falling into the lower hole 21, it can be found that the bolt 40 can be fastened.

Figure 6:
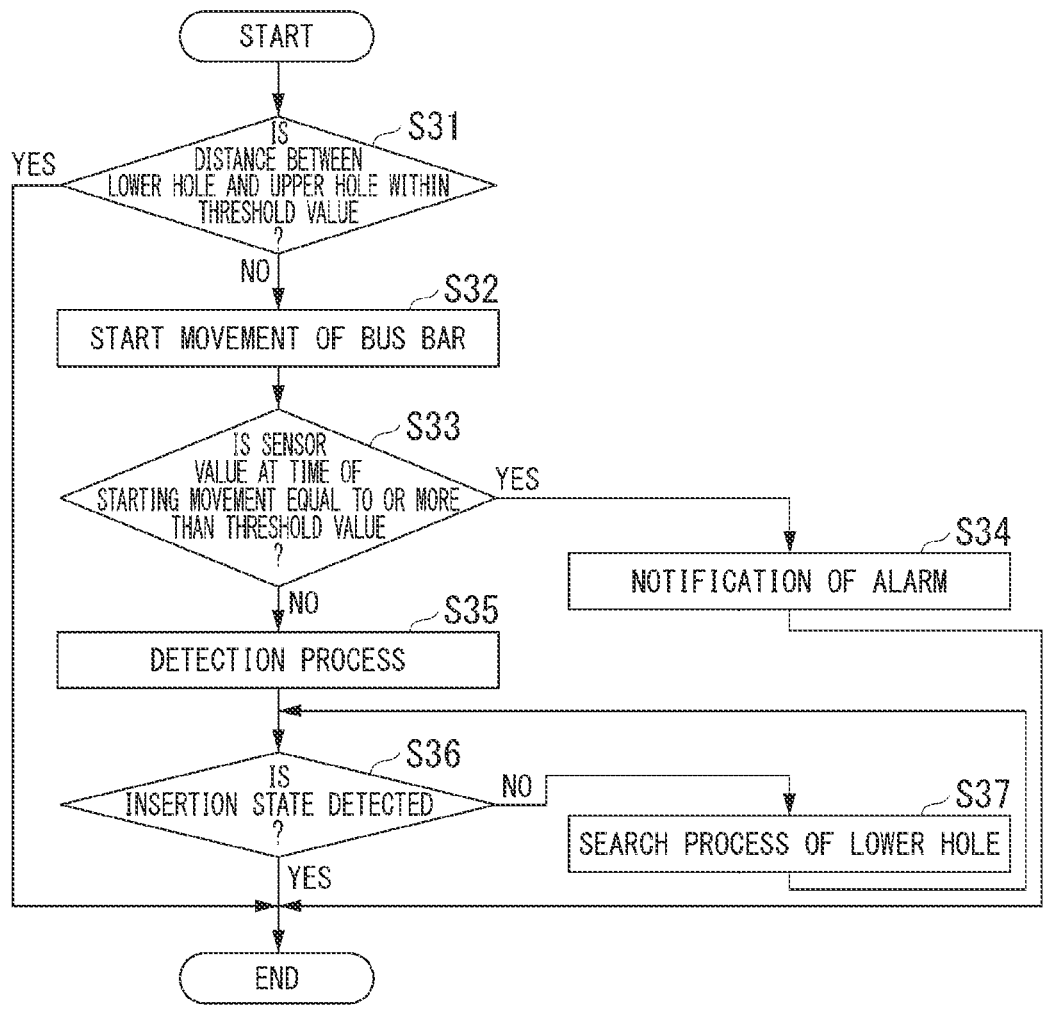
FIG. 6 is a flowchart showing a flow of the correction process.

FIG. 6 is a flowchart showing a flow of the correction process. The control device 11 determines whether or not a distance between the center coordinate of the upper hole 31 and the center coordinate of the lower hole 21 is within a predetermined threshold value (Step S31). When the distance is within the threshold value (Yes in Step S31), this indicates that the position of the upper hole 31 and the position of the lower hole 21 almost coincide with each other, and it is determined that the positional alignment between the upper hole 31 and the lower hole 21 is unnecessary. In this case, the control device 11 omits the processes of S32 to S37. Thereby, it is possible to omit an unnecessary process and improve efficiency.

The predetermined threshold value in Step S31 is, for example, 0.5 mm. However, the embodiment is not limited to the example. The predetermined threshold may be set, for example, in accordance with the diameter of the bolt 40, the size or the material of a member, or the like.

On the other hand, when the distance between the center coordinate of the upper hole 31 and the center coordinate of the lower hole 21 exceeds the predetermined threshold value (No in Step S31), this indicates that the positions of the upper hole 31 and the lower hole 21 are displaced from each other. Accordingly, the control device 11 controls the robot hand 15 to start the movement of the bus bar 30 in a state where the bolt 40 is inserted in the upper hole 31 (Step S32). Specifically, the control device 11 moves the bus bar 30 linearly in the direction of the center coordinate of the lower hole 21 calculated in Step S15 or S17 of FIG. 3.

The robot hand 15 in the present embodiment includes a bolt chuck mechanism. By chucking a portion for holding the bus bar 30, the bus bar 30 can be held rigidly at the time of movement. Thereby, it is possible to prevent the occurrence of an event such as twisting or dropping of the bolt 40. Further, by providing the bolt chuck mechanism, not only can a relatively lightweight component such as the bus bar 30 be moved but also a heavy component.

The control device 11 starts the movement of the bus bar 30 and acquires a sensor value measured by the haptic sensor 54. The control device 11 determines whether or not the acquired sensor value exceeds a threshold value (Step S33). When the bus bar 30 together with the bolt 40 is moved, a large load may be applied on the bolt 40 due to being caught by another component, for example. By the load being applied, depending on the weight of a member, there is a possibility that the bolt 40 or the base member 20 is damaged, or each member is deformed.

Accordingly, the control device 11 measures the magnitude of a force applied on the bolt 40 by the haptic sensor 54 at the time of starting the movement. When the force applied on the bolt 40 is equal to or more than a predetermined threshold value (Yes in Step S33), the control device 11 determines that an abnormal state has occurred. Therefore, the control device 11 performs notification of an alarm (Step S34) and completes the correction process. In this way, by determining the load on the bolt 40 at the time of starting the movement of the bus bar 30, it is possible to promptly prevent the occurrence of the abnormal state.

On the other hand, when the sensor value is less than the threshold value (No in Step S33), the control device 11 continues the movement of the bus bar 30. The control device 11 detects an insertion state of the bolt 40 into the lower hole 21 while moving the bus bar 30 (Step S35). That is, the control device 11 detects whether or not the bolt 40 has fallen into the lower hole 21.

Figure 7:
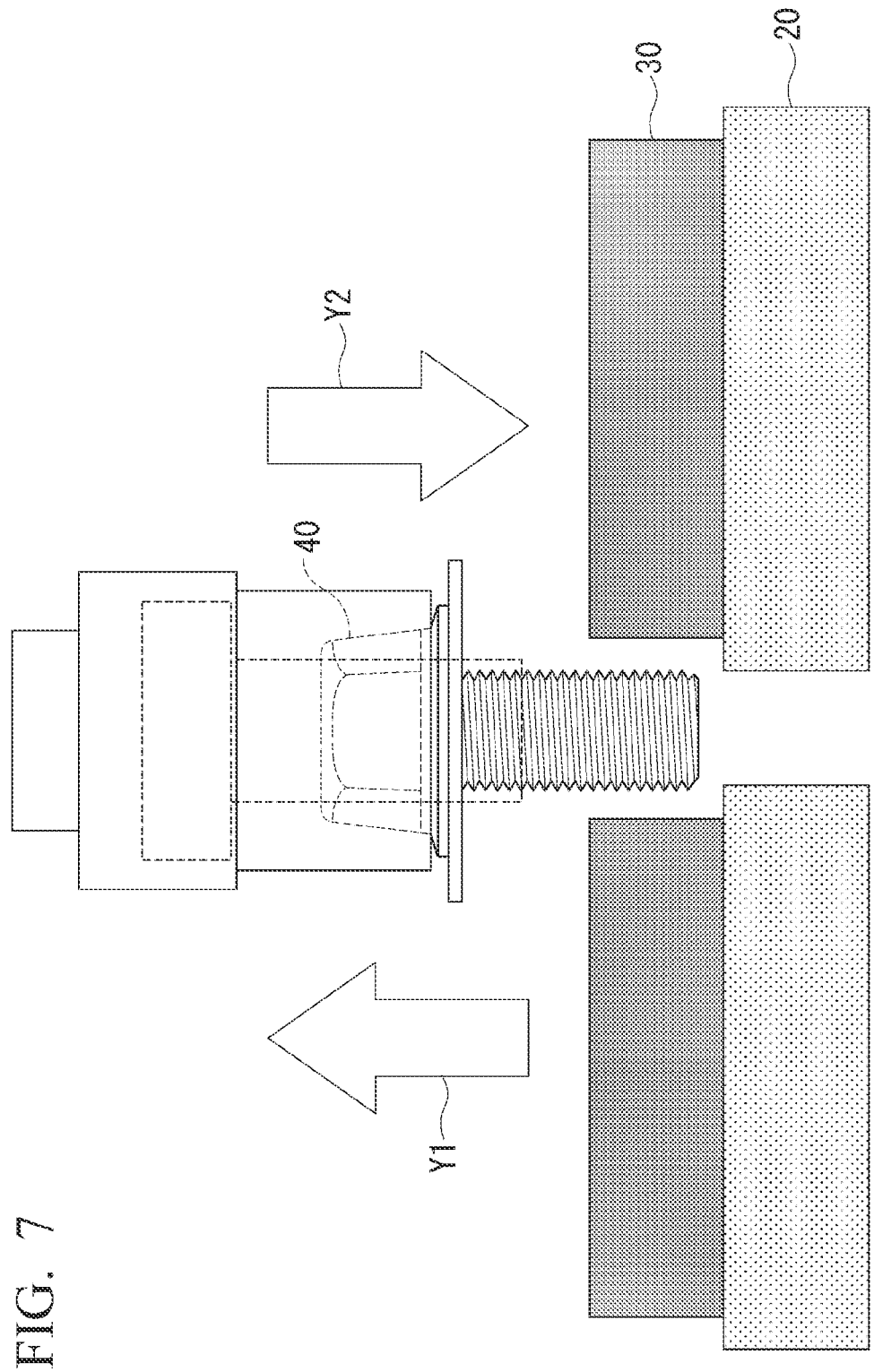
FIG. 7 is a view showing a detection process of an insertion state.

FIG. 7 is a view showing a detection process of the insertion state. The control device 11 in the present embodiment detects whether or not the bolt 40 is inserted into the lower hole 21 on the basis of a sensor value of the haptic sensor 54 or the displacement sensor 55.

The haptic sensor 54 measures a force (a reaction force value) in a direction represented by an arrow Y1 of FIG. 7. In a state where the bolt 40 does not fall in the lower hole 21 at the time of movement, by the bolt 40 being in contact with the base member 20, a reaction force in the Z-axis direction from the base member 20 is maintained in a constant range. On the other hand, when the bolt 40 falls in the lower hole 21, the reaction force value decreases. The control device 11 acquires the reaction force value in the Z-axis direction from the haptic sensor 54 and detects that the force applied on the bolt 40 in the Z-axis direction is changed when the reaction force value exceeds a predetermined threshold value. Alternatively, the control device 11 may detect that the force applied on the bolt 40 in the Z-axis direction is changed when a change amount of the reaction force value exceeds a predetermined threshold value. Thereby, the control device 11 detects that the bolt 40 has fallen into the lower hole 21, namely, that the bolt 40 is inserted into the lower hole 21.

The displacement sensor 55 measures, for example, a displacement in the Z-axis direction represented by an arrow Y2 of FIG. 7. In a state where the bolt 40 does not fall into the lower hole 21 at the time of movement, the position in the Z-axis direction of the bolt 40 is not significantly changed. On the other hand, when the bolt 40 falls into the lower hole 21, the displacement amount temporarily increases in accordance with the significant change of the position. The control device 11 detects that the position of the bolt 40 is rapidly changed when the displacement amount exceeds a predetermined threshold value. Alternatively, the control device 11 may detect that the position of the bolt 40 is rapidly changed when a change degree of the displacement amount exceeds a predetermined threshold value. Thereby, the control device 11 detects that the bolt 40 has fallen into the lower hole 21, namely, that the bolt 40 is inserted into the lower hole 21.

In this way, by detecting the insertion state by using a sensor value of the haptic sensor 54, the displacement sensor 55, or the like, it is possible to detect whether or not the bolt 40 is appropriately inserted with high accuracy. Thereby, it is possible to avoid a situation in which the fastening process is performed in a state where the insertion state of the bolt 40 is not appropriate or is insufficient, and a member is damaged or broken. In the present embodiment, by moving the bus bar 30 together with the bolt 40, an inclination or a twist of the bolt 40 may occur at the time of movement. Therefore, a detection process based on the sensor value of the haptic sensor 54 and a detection process based on the sensor value of the displacement sensor 55 are combined. Thereby, when the bus bar 30 is moved together with the bolt 40, it is possible to detect the insertion state of the bolt 40 with high accuracy.

The present embodiment is described using an example in which the control device 11 performs the detection process on the basis of the sensor values measured by the haptic sensor 54 and the displacement sensor 55. However, the embodiment is not limited to the example. The control device 11 may perform the detection process on the basis of a sensor value measured by any one of the haptic sensor 54 and the displacement sensor 55. Alternatively, a detection device may determine that the bolt 40 is inserted on the basis of a torque value at the time of fastening the bolt 40.

When it is detected that the bolt 40 is inserted into the lower hole 21 (Yes in Step S36), the control device 11 completes the correction process. On the other hand, when it is not detected that the bolt 40 is inserted into the lower hole 21 even when moving linearly in the direction of the calculated center coordinate of the lower hole 21 (No in Step S36), the control device 11 performs positional alignment in accordance with another method (Step S37).

The control device 11 performs the correction process by performing the positional alignment between the upper hole 31 and the lower hole 21 while searching the position of the lower hole 21 from the peripheral region.

When the bolt 40 does not fall even when the correction process is performed in accordance with the position of the lower hole 21 calculated on the basis of the capture image data, for example, the following situations are assumed. The situations include a case where the position of the base member 20 is displaced in conjunction with the movement of the bus bar 30 or a case where the base member 20 itself is arranged to be inclined. In these cases, the position coordinate of the lower hole 21 calculated from the capture image data may not be appropriate. Alternatively, due to manufacturing errors, the position of the lower hole 21 in the base member 20 may be originally displaced. In such cases, the control device 11 searches the position of the lower hole 21 by switching to another method.

For example, the control device 11 controls the robot hand 15 to reciprocate the bus bar 30 in a state where the bolt 40 is inserted while changing a movement direction. Specifically, the control device 11 controls the robot hand 15 to reciprocate the bus bar 30 while changing the movement direction around the present position of the bolt 40. That is, the control device 11 searches the position of the lower hole 21 from the peripheral region with respect to all directions. By performing such a search, even when the position of the lower hole 21 is unknown, it is possible to detect the position of the lower hole 21.

In this way, even when the position of the lower hole 21 is calculated on the basis of the capture image data, when the insertion state is not detected, the control device 11 in the present embodiment performs the positional alignment by another method. In this way, by combining a plurality of different methods for the lower hole 21, it is possible to increase a success rate of the correction process.

When the control device 11 detects that the bolt 40 is inserted into the lower hole 21 in accordance with the process of Step S37 (Yes in Step S36), the control device 11 completes the correction process. On the other hand, when it is not detected that the bolt 40 is inserted into the lower hole 21 in accordance with another search method, the control device 11 performs notification of an alarm and completes the correction process.

Figure 8A:
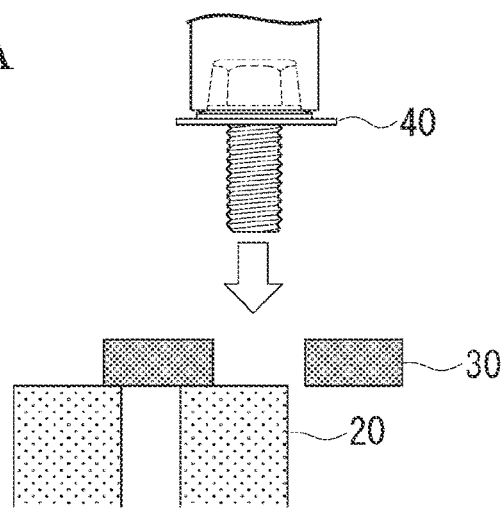
FIG. 8A is a view schematically representing an example of the correction process.

FIGS. 8A to 8D are views schematically representing an example of the correction process. FIG. 8A shows an example of the case where part of the lower hole 21 is not seen from the inside of the upper hole 31, and the lower hole 21 is covered by the bus bar 30.

According to FIG. 8A, since the lower hole 21 of the base member 20 is covered by the bus bar 30, the image of the lower hole 21 is not detected from the capture image data. Since the capture image data includes the image of the upper hole 31, the control device 11 calculates the center coordinate of the upper hole 31 on the basis of the capture image data. Further, the control device 11 detects the outline of the base member 20 from the capture image data and calculates the center coordinate of the lower hole 21 on the basis of the distance information between the outline and the lower hole 21.

Figure 8B:
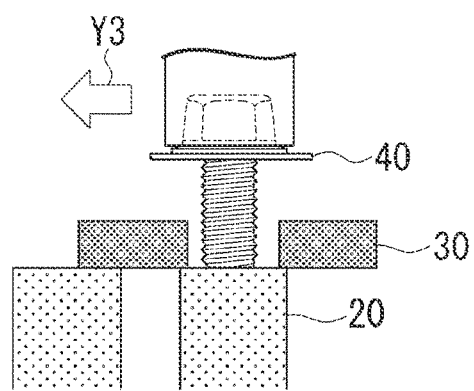
FIG. 8B is a view schematically representing an example of the correction process.

The control device 11 controls the robot hand 15 to move the bolt 40 to the calculated center coordinate of the upper hole 31. Thereby, as shown in FIG. 8B, the bolt 40 is inserted into the upper hole 31 of the bus bar 30. The control device 11 moves the bus bar 30 in a state where the bolt 40 is inserted in the upper hole 31 linearly in the direction (Y3) of the calculated center coordinate of the lower hole 21.

Figure 8C:
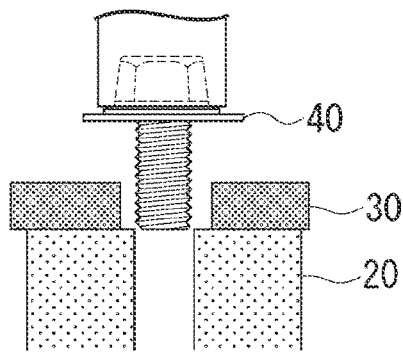
FIG. 8C is a view schematically representing an example of the correction process.
Figure 8D:
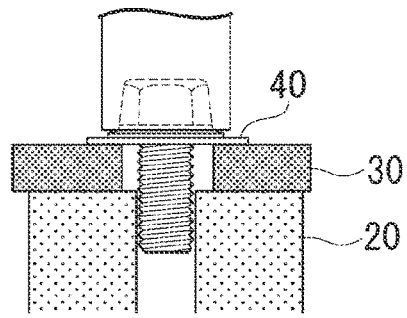
FIG. 8D is a view schematically representing an example of the correction process.

As a result, as shown in FIG. 8C, the bolt 40 moves to the position of the lower hole 21 on the XY plane. The positions on the XY plane of the upper hole 31 and the lower hole 21 overlap each other, and thereby, the bolt 40 falls into the lower hole 21 as shown in FIG. 8D. Thereby, the bolt 40 becomes a state of being inserted in the upper hole 31 and the lower hole 21. The bolt 40 is fastened in this state, and thereby, the bus bar 30 is assembled to the base member 20.

As described above, the fastening apparatus 10 of the present embodiment includes the imaging device 51 and the control device 11. The imaging device captures, in a state where an assembly component (for example, a bus bar) having a first fastening hole (upper hole) is mounted on an upper portion of an assembled component (for example, a base member) having a second fastening hole (lower hole), an image of a region including at least the first fastening hole. The control device calculates a first position of the first fastening hole and a second position of the second fastening hole based on the captured image. The control device controls a robot to cause a fastening member to be moved to and inserted into the first fastening hole based on the first position and to move the assembly component in a state where the fastening member is inserted in the first fastening hole in a direction of the second position. The control device controls the robot to fasten the fastening member in response to detection of the fastening member (for example, a bolt) being inserted into the second fastening hole. As described above, the bus bar is an example of the assembly component in the present embodiment. The base member is an example of the assembled component in the present embodiment. Similarly, the bolt is an example of the fastening member in the present embodiment.

In this way, the fastening apparatus 10 captures the image of the region including at least the upper hole 31 in a state where the bus bar 30 is mounted on the base member 20. Thereby it is possible to detect the positional relationship between the upper hole 31 and the lower hole 21 on the basis of the capture image data acquired by one imaging. The positional information of the upper hole 31 and the lower hole 21 can be calculated with high accuracy on the basis of the positional relationship in the capture image data. Accordingly, on the basis of the calculated positional information of the upper hole 31 and the lower hole 21, it is possible to realize the insertion of the bolt 40 into the upper hole 31 of the bus bar 30, and it is possible to move the bus bar 30 linearly in the positional direction of the lower hole 21 in a state where the bolt 40 is inserted in the upper hole 31. Thereby, a search process from the peripheral region of the lower hole 21 also becomes unnecessary. In this way, the positional alignment between the upper hole 31 and the lower hole 21 can be realized with a small number of processes, with high accuracy, and at a high speed. Accordingly, it is possible to automate the fastening process and shorten the time required for the fastening process.

Further, when the captured image includes an image of at least part of the second fastening hole, the control device in the present embodiment calculates the second position of the second fastening hole based on the image of the second fastening hole of the captured image. In this way, by capturing the image of the region including at least the upper hole 31 in a state where the bus bar 30 is mounted on the base member 20, when the capture image data includes at least part of the image of the lower hole and the image of the upper hole 31, it is possible to detect the positions of the upper hole 31 and the lower hole 21. Thereby, it is possible to calculate the position of each of the upper hole 31 and the lower hole 21 by one imaging.

Further, the fastening apparatus in the present embodiment includes a storage means (storage device) that stores distance information indicating a distance from an outline of the assembled component to the second fastening hole. The control device calculates the second position based on a position of the outline of the assembled component in the captured image and the distance information when the captured image does not include an image of at least part of the second fastening hole. Thereby, even when the lower hole 21 is hidden by the bus bar 30, it is possible to calculate the position of the lower hole 21 on the basis of the capture image data. In this way, even when the positions of the upper hole 31 and the lower hole 21 are displaced from each other, it is possible to calculate the position of the lower hole 21 in addition to the position of the upper hole 31 by one imaging.

Further, the fastening apparatus in the present embodiment further includes: a haptic sensor that measures a force applied on the fastening member. When the assembly component in a state where the fastening member is inserted in the first fastening hole is moved in the direction of the second position, the control device stops the movement when a sensor value obtained by the haptic sensor exceeds a first threshold value. Thereby, when the bus bar 30 is moved in a state where the bolt 40 is inserted in the upper hole 31, it is possible to promptly detect the occurrence of an abnormal state. Thereby, when promoting automation of the fastening process, it is possible to prevent the bolt 40 from being deformed or damaged.

Further, the fastening apparatus in the present embodiment includes: at least a sensor which is any one of a haptic sensor that measures a force applied on the fastening member and a displacement sensor that measures a movement amount of the fastening member. The control device detects that the fastening member is inserted into the second fastening hole when a sensor value obtained by the sensor or a change amount of the sensor value exceeds a second threshold value. Thereby, it is possible to detect, with high accuracy, whether or not the bolt 40 is inserted in the lower hole 21. Therefore, it is possible to avoid a situation in which the fastening process is performed in a state where the insertion state of the bolt 40 is not appropriate or is insufficient, and a member is damaged or broken. Accordingly, it is possible to promote automation of the fastening process, and it is possible to realize the fastening process with high accuracy.

Further, the control device in the present embodiment controls the robot to reciprocate the assembly component in a state where the fastening member is inserted in the first fastening hole while changing a movement direction when it is not detected that the fastening member is inserted into the second fastening hole after the assembly component in the state where the fastening member is inserted in the first fastening hole is moved in the direction of the second position. In this way, even when moving to the position of the lower hole 21 calculated on the basis of the capture image data, when it is not possible to insert the bolt 40, it is possible to switch to another search method. In this way, by combining a plurality of different search methods for the lower hole 21, it is possible to increase a success rate of the correction process.

Further, the control device in the present embodiment performs the following process when a distance between the calculated first position and the calculated second position is less than a predetermined value. That is, the control device causes the fastening member to be moved to and inserted into the first fastening hole based on the first position and fastens the fastening member without moving the assembly component in a state where the fastening member is inserted in the first fastening hole in the direction of the second position. Thereby, when the positional alignment between the upper hole 31 and the lower hole 21 is unnecessary, it is possible to omit an unnecessary process, and it is possible to improve the efficiency of the process.

Modification Example

The above embodiment is described using an example in which a single fastening hole of the bus bar 30 is fastened by the bolt 40; however, the embodiment is also applicable to the case where a plurality of fastening holes are fastened. For example, the bus bar 30 has a plurality of fastening holes. For example, when some of the fastening holes is fastened by the bolt 40, the bus bar 30 is fixed to the base member 20. By such fastening, when performing the correction process of another fastening hole, the bus bar 30 may not be moved.

Accordingly, when the bus bar 30 has a plurality of fastening holes, the control device 11 may control a fastening hole that is fastened earlier to be in a temporarily fastened state (floating state). The temporarily fastened state indicates, for example, a state in which a fastening degree is loosened. The control device 11 may enhance the fastening degree of the bolt 40 of each fastening hole after the temporary fastening of the plurality of fastening holes is completed. Thereby, even when the assembly component has a plurality of fastening holes, it is possible to promote automation of the fastening process.

The above embodiment is described using an example in which when it is impossible to perform the positional alignment between the upper hole 31 and the lower hole 21 on the basis of the position of the lower hole 21 calculated based on the capture image data, another search process (Step S37) is performed. When the bus bar 30 has a plurality of fastening holes, the process may be performed as follows. For example, in the correction process of a fastening hole that is fastened secondly or later among the plurality of fastening holes, when the insertion state is not detected (No in S36), the control device 11 may perform notification of an alarm and complete the fastening process. Thereby, it is possible to promptly detect an abnormality in the correction process, and it is possible to improve the efficiency of the process.

Further, in addition to the case where the bus bar 30 has a plurality of fastening holes, in some cases, a plurality of members (assembly components) are assembled to a single base member 20 (assembled component). Even in such cases, by part of the plurality of members being fixed to the base member 20, it may be impossible to perform the movement process in the correction process of the other members. Even in such cases, the control device 11 may control the fastening hole of each of the plurality of members to be in a temporarily fastened state. The control device 11 may enhance the fastening degree of the fastening hole of each member after the temporary fastening of the fastening hole of each of the plurality of members is completed.

The control device 11 may determine the order in which a plurality of fastening holes are fastened. The control device 11 performs the fastening process in accordance with a predetermined fastening order. At this time, the control device 11 performs the fastening such that other fastening holes become the temporarily fastened state until a fastening hole that is finally fastened is fastened by the bolt 40. The control device 11 controls the other fastening holes from the temporarily fastened state to a finally fastened state after the final fastening hole is fastened.

In this way, the assembly component in the modification example has a plurality of first fastening holes. A fastening process is performed on one first fastening hole among the plurality of first fastening holes later than another first fastening hole among the plurality of first fastening holes. In such a case, the control device moves the assembly component in a state where the fastening member is inserted in the one first fastening hole in the direction of the second position in a state where a fastening state of the fastening member of the other first fastening hole is loosened. Thereby, even when the bus bar 30 has a plurality of fastening holes, the bus bar 30 can be moved for each of the plurality of upper holes 31. Accordingly, even when the bus bar 30 has a plurality of fastening holes, it is possible to promote an automation process of the fastening process.

Although a mode for implementing the present invention has been described using embodiments, the present invention is not limited to these embodiments, and various modifications and substitutions can be added without departing from the scope of the present invention.

What is claimed is:

1. A fastening apparatus that assembles an assembly component to an assembled component by fastening a fastening member, the fastening apparatus comprising:
   an imaging device that captures, in a state where the assembly component having a first fastening hole is mounted on an upper portion of the assembled component having a second fastening hole, an image of a region including at least the first fastening hole;

a control device that calculates a first position of the first fastening hole and a second position of the second fastening hole based on the captured image; and a robot, wherein the robot places the assembly component on the assembled component, the imaging device captures an image of the region including at least the first fastening hole of the assembly component in a state where the assembly component is placed on the assembled component, and the imaging device generates capture image data of the region including at least the first fastening hole, the control device calculates the first position of the first fastening hole and the second position of the second fastening hole based on the generated capture image data, and the control device controls the robot to cause the fastening member to be moved to and inserted into the first fastening hole based on the first position and to move the assembly component in a state where the fastening member is inserted in the first fastening hole in a direction of the second position, and controls the robot to fasten the fastening member in response to detection of the fastening member being inserted into the second fastening hole.

2. The fastening apparatus according to claim 1, wherein when the capture image data includes an image of at least part of the second fastening hole, the control device calculates the second position of the second fastening hole based on the image of the second fastening hole of the capture image data.

3. The fastening apparatus according to claim 2, comprising:

a storage device that stores distance information indicating a distance from an outline of the assembled component to the second fastening hole, wherein the control device calculates the second position based on a position of the outline of the assembled component in the capture image data and the distance information when the capture image data does not include the image of at least part of the second fastening hole.

4. The fastening apparatus according to claim 2, further comprising:

a haptic sensor that measures a force applied on the fastening member, wherein when the assembly component in a state where the fastening member is inserted in the first fastening hole is moved in the direction of the second position, the control device stops the movement when a sensor value obtained by the haptic sensor exceeds a first threshold value.

5. The fastening apparatus according to claim 2, comprising:

at least a sensor which is any one of a haptic sensor that measures a force applied on the fastening member and a displacement sensor that measures a movement amount of the fastening member, wherein the control device detects that the fastening member is inserted into the second fastening hole when a sensor value obtained by the sensor or a change amount of the sensor value exceeds a second threshold value.

6. The fastening apparatus according to claim 2, wherein the control device controls the robot to reciprocate the assembly component in a state where the fastening member is inserted in the first fastening hole while changing a movement direction when it is not detected that the fastening member is inserted into the second fastening hole after the assembly component in the state where the fastening member is inserted in the first fastening hole is moved in the direction of the second position.

7. The fastening apparatus according to claim 2, wherein when a distance between the calculated first position and the calculated second position is less than a predetermined value, the control device causes the fastening member to be moved to and inserted into the first fastening hole based on the first position and fastens the fastening member without moving the assembly component in a state where the fastening member is inserted in the first fastening hole in the direction of the second position.

8. The fastening apparatus according to claim 2, wherein the assembly component includes a plurality of first fastening holes each being the first fastening hole, a fastening process is performed on one first fastening hole among the plurality of first fastening holes later than another first fastening hole among the plurality of first fastening holes, and the control device moves the assembly component in a state where the fastening member is inserted in the one first fastening hole in the direction of the second position in a state where a fastening state of the fastening member of the other first fastening hole is loosened.

9. The fastening apparatus according to claim 1, comprising:

a storage device that stores distance information indicating a distance from an outline of the assembled component to the second fastening hole, wherein the control device calculates the second position based on a position of the outline of the assembled component in the capture image data and the distance information when the capture image data does not include an image of at least part of the second fastening hole.

10. The fastening apparatus according to claim 1, further comprising:

a haptic sensor that measures a force applied on the fastening member, wherein when the assembly component in a state where the fastening member is inserted in the first fastening hole is moved in the direction of the second position, the control device stops the movement when a sensor value obtained by the haptic sensor exceeds a first threshold value.

11. The fastening apparatus according to claim 1, comprising:

at least a sensor which is any one of a haptic sensor that measures a force applied on the fastening member and a displacement sensor that measures a movement amount of the fastening member, wherein the control device detects that the fastening member is inserted into the second fastening hole when a sensor value obtained by the sensor or a change amount of the sensor value exceeds a second threshold value.

12. The fastening apparatus according to claim 1, wherein the control device controls the robot to reciprocate the assembly component in a state where the fastening member is inserted in the first fastening hole while changing a movement direction when it is not detected that the fastening member is inserted into the second fastening hole after the assembly component in the state where the fastening member is inserted in the first fastening hole is moved in the direction of the second position.

13. The fastening apparatus according to claim 1, wherein when a distance between the calculated first position and the calculated second position is less than a predetermined value, the control device causes the fastening member to be moved to and inserted into the first fastening hole based on the first position and fastens the fastening member without moving the assembly component in a state where the fastening member is inserted in the first fastening hole in the direction of the second position.

14. The fastening apparatus according to claim 1, wherein the assembly component includes a plurality of first fastening holes each being the first fastening hole, a fastening process is performed on one first fastening hole among the plurality of first fastening holes later than another first fastening hole among the plurality of first fastening holes, and the control device moves the assembly component in a state where the fastening member is inserted in the one first fastening hole in the direction of the second position in a state where a fastening state of the fastening member of the other first fastening hole is loosened.

\* \* \* \* \*